United States Patent
Bromberg et al.

(10) Patent No.: US 10,227,945 B2
(45) Date of Patent: *Mar. 12, 2019

(54) GASOLINE PARTICULATE REDUCTION USING OPTIMIZED PORT FUEL INJECTION PLUS DIRECT INJECTION

(71) Applicant: Ethanol Boosting Systems, LLC, Cambridge, MA (US)

(72) Inventors: Leslie Bromberg, Sharon, MA (US); Daniel R. Cohn, Cambridge, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,997

(22) Filed: Sep. 25, 2017

(65) Prior Publication Data

US 2018/0087466 A1 Mar. 29, 2018

Related U.S. Application Data

(60) Provisional application No. 62/399,755, filed on Sep. 26, 2016, provisional application No. 62/432,140, (Continued)

(51) Int. Cl.
*F02D 41/00* (2006.01)
*F02D 41/40* (2006.01)
(Continued)

(52) U.S. Cl.
CPC .......... *F02D 41/402* (2013.01); *F01N 3/035* (2013.01); *F02D 35/027* (2013.01); *F02D 37/02* (2013.01);
(Continued)

(58) Field of Classification Search
CPC .... F02D 41/3094; F02D 41/34; F02D 41/402; F02D 41/401; F02D 41/40
See application file for complete search history.

(56) References Cited

U.S. PATENT DOCUMENTS

| 5,927,238 A | 7/1999 | Watson |
| 6,305,169 B1 | 10/2001 | Mallof |

(Continued)

FOREIGN PATENT DOCUMENTS

| CN | 101228342 A | 7/2008 |
| CN | 102345532 A | 2/2012 |

(Continued)

OTHER PUBLICATIONS

European communication dated Apr. 9, 2018 in co-pending European patent application No. 15838005.5.
(Continued)

*Primary Examiner* — Thomas Moulis
(74) *Attorney, Agent, or Firm* — Nields, Lemack & Frame, LLC

(57) ABSTRACT

An optimized port plus direct injection (PFI+DI) fueling system for reducing DI-generated particulates from a spark ignition gasoline engine is disclosed. It uses information from a computational model that includes piston wetting. Means for DI particulate reduction include control of DI timing and duration as a function of various parameters. Illustrative computational results for decreasing particulates in various drive cycles are presented. These calculations illustrate large potential particulate reductions (e.g. 95%) that can be obtained relative to DI operation alone. The optimized PFI+DI system could provide DI generated particulate reduction, efficiency and cost advantages relative to operation of a DI alone engine with a gasoline particulate filter (GPF). Alternatively, it could be used in combination with a GPF to ease GPF operation requirements and provide additional particulate reduction. Techniques for reducing piston wetting generation of particles from use of DI alone are also described.

34 Claims, 5 Drawing Sheets

Related U.S. Application Data filed on Dec. 9, 2016, provisional application No. 62/477,587, filed on Mar. 28, 2017, provisional application No. 62/531,935, filed on Jul. 13, 2017.

(51) Int. Cl.
    *F01N 3/035*     (2006.01)
    *F02D 37/02*     (2006.01)
    *F02D 41/14*     (2006.01)
    *F02D 41/24*     (2006.01)
    *F02D 41/30*     (2006.01)
    *F02D 35/02*     (2006.01)
    *F02D 41/38*     (2006.01)

(52) U.S. Cl.
    CPC ..... *F02D 41/1448* (2013.01); *F02D 41/1498* (2013.01); *F02D 41/2422* (2013.01); *F02D 41/3094* (2013.01); *F02D 41/401* (2013.01); *F01N 2250/02* (2013.01); *F02D 2041/389* (2013.01); *F02D 2200/021* (2013.01); *F02D 2200/08* (2013.01); *F02D 2200/1002* (2013.01)

(56) References Cited

U.S. PATENT DOCUMENTS

| | | | |
|---|---|---|---|
| 6,453,664 B2 | 9/2002 | Ishii et al. | |
| 6,637,386 B2 | 10/2003 | Murata et al. | |
| 6,805,095 B2 | 10/2004 | Sun et al. | |
| 7,225,787 B2 | 6/2007 | Bromberg et al. | |
| 7,303,144 B2 | 12/2007 | Alyanak | |
| 7,370,610 B2 | 5/2008 | Ashford et al. | |
| 7,546,834 B1 | 6/2009 | Ulrey et al. | |
| 7,640,914 B2 | 1/2010 | Lewis et al. | |
| 7,647,916 B2 | 1/2010 | Leone et al. | |
| 7,690,341 B2 | 4/2010 | Abe et al. | |
| 7,765,053 B2 | 7/2010 | Gwidt et al. | |
| 7,770,560 B2 | 8/2010 | Ulrey et al. | |
| 7,933,713 B2 | 4/2011 | Leone | |
| 7,957,888 B2 | 6/2011 | Leone et al. | |
| 8,037,850 B2 | 10/2011 | Pursifull | |
| 8,099,949 B2 | 1/2012 | Leone et al. | |
| 8,100,107 B2 | 1/2012 | Bidner et al. | |
| 8,146,568 B2 | 4/2012 | Cohn et al. | |
| 8,206,470 B1 | 6/2012 | Jacobson | |
| 8,267,074 B2 | 9/2012 | Leone et al. | |
| 8,275,538 B2 | 9/2012 | Sumilla et al. | |
| 8,353,269 B2 | 1/2013 | Kasseris et al. | |
| 8,397,701 B2 | 3/2013 | Lewis et al. | |
| 8,459,007 B2 | 6/2013 | Maier et al. | |
| 8,578,913 B2 | 11/2013 | Yoshioka et al. | |
| 8,875,680 B2 | 11/2014 | Yoshioka | |
| 8,944,026 B2 | 2/2015 | Tobergte et al. | |
| 9,382,857 B2 | 7/2016 | Glugla et al. | |
| 9,435,288 B2 | 9/2016 | Cohn et al. | |
| 9,441,570 B2 | 9/2016 | Cohn et al. | |
| 9,512,798 B2 | 12/2016 | Zeng et al. | |
| 9,556,784 B2 | 1/2017 | Leone | |
| 9,631,573 B2 | 4/2017 | Sumilla et al. | |
| 9,739,213 B2 | 8/2017 | Kemmerling et al. | |
| 9,840,980 B2 | 12/2017 | Cohn et al. | |
| 9,874,168 B2 * | 1/2018 | Thomas | F02D 41/062 |
| 9,945,297 B2 * | 4/2018 | Tsuyuki | F02D 41/10 |
| 9,976,496 B2 | 5/2018 | Cohn et al. | |
| 2001/0003280 A1 * | 6/2001 | Yang | F02B 17/005 |
| | | | 123/295 |
| 2004/0163379 A1 | 8/2004 | Pott et al. | |
| 2005/0166891 A1 * | 8/2005 | Fukasawa | F02D 35/025 |
| | | | 123/305 |
| 2006/0180121 A1 | 8/2006 | Wickman et al. | |
| 2007/0089697 A1 | 4/2007 | Hara et al. | |
| 2008/0022958 A1 | 1/2008 | I et al. | |
| 2009/0088945 A1 * | 4/2009 | Yi | F02D 41/401 |
| | | | 701/103 |
| 2009/0282810 A1 | 11/2009 | Leone et al. | |
| 2009/0299607 A1 * | 12/2009 | Bauer | F02D 41/3035 |
| | | | 701/103 |
| 2010/0049420 A1 | 2/2010 | Smith et al. | |
| 2010/0251996 A1 | 10/2010 | Akimoto | |
| 2011/0023467 A1 | 2/2011 | Kong et al. | |
| 2011/0162620 A1 * | 7/2011 | Bidner | F02D 41/0025 |
| | | | 123/299 |
| 2011/0203258 A1 | 8/2011 | Makartchouk et al. | |
| 2011/0265758 A1 | 11/2011 | Glugla et al. | |
| 2011/0301827 A1 | 12/2011 | Toyohara et al. | |
| 2011/0320108 A1 * | 12/2011 | Morinaga | F02D 41/0057 |
| | | | 701/105 |
| 2012/0024262 A1 | 2/2012 | Leone | |
| 2012/0102925 A1 | 5/2012 | Leone et al. | |
| 2012/0107203 A1 | 5/2012 | Arnold et al. | |
| 2014/0100760 A1 | 4/2014 | Yi et al. | |
| 2014/0172275 A1 | 6/2014 | Sumilla et al. | |
| 2014/0297162 A1 | 10/2014 | Sumilla et al. | |
| 2014/0331653 A1 | 11/2014 | Irisawa | |
| 2015/0240737 A1 | 8/2015 | Sumilla et al. | |
| 2015/0285179 A1 * | 10/2015 | Cohn | F02D 41/3094 |
| | | | 701/104 |
| 2015/0369162 A1 | 12/2015 | Cohn et al. | |
| 2015/0377175 A1 * | 12/2015 | Mano | F02D 41/401 |
| | | | 123/294 |
| 2016/0115884 A1 | 4/2016 | VanDerWege et al. | |
| 2016/0237943 A1 * | 8/2016 | Zhang | F02D 41/18 |
| 2016/0319764 A1 | 11/2016 | Cohn et al. | |
| 2016/0326971 A1 | 11/2016 | Cohn et al. | |
| 2016/0356228 A1 | 12/2016 | Liu et al. | |
| 2017/0145944 A1 * | 5/2017 | Felix Moreno | F02D 41/3836 |
| 2017/0234257 A1 * | 8/2017 | Sellnau | F02D 35/028 |
| | | | 123/299 |
| 2017/0363035 A1 | 12/2017 | Cohn et al. | |
| 2018/0016996 A1 | 1/2018 | Bernhard et al. | |
| 2018/0023500 A1 * | 1/2018 | Hollar | F02D 41/3076 |
| 2018/0058364 A1 * | 3/2018 | Kassai | F02D 41/22 |
| 2018/0066598 A1 * | 3/2018 | Dusa | F02D 41/3094 |
| 2018/0128145 A1 * | 5/2018 | Uhrich | F01N 3/2053 |
| 2018/0238245 A1 | 8/2018 | Cohn et al. | |
| 2018/0306106 A1 * | 10/2018 | Glugla | F02B 75/044 |

FOREIGN PATENT DOCUMENTS

| | | |
|---|---|---|
| CN | 102400802 A | 4/2012 |
| CN | 104968913 A | 10/2015 |
| DE | 102015201191 A1 | 7/2016 |
| JP | 2006-250058 A | 9/2006 |
| JP | 2009-299538 A | 12/2009 |
| JP | 2010-255507 A | 11/2010 |
| WO | 2012/021990 A1 | 2/2012 |
| WO | 2013/080371 A1 | 6/2013 |
| WO | 2014/089304 A1 | 6/2014 |

OTHER PUBLICATIONS

International Search Report and Written Opinion dated Apr. 16, 2014 in co-pending PCT application No. PCT/US2013/073334.
International Search Report and Written Opinion dated Dec. 4, 2015 in co-pending PCT application No. PCT/US2015/047857.
International Search Report and Written Opinion dated Dec. 11, 2017 in corresponding PCT application No. PCT/US2017/053179.
Chinese communication, with English translation, dated Feb. 4, 2017 in co-pending Chinese patent application No. 201380072556. 5.
Ketterer, "Soot Formation in Direct Injection Spark Ignition Engines Under Cold-Idle Operating Conditions," Department of Mechanical Engineering, Massachusetts Institute of Technology, Sep. 2013.
Office action dated May 24, 2017 in co-pending U.S. Appl. No. 15/214,533.
Office action dated Aug. 31, 2017 in co-pending U.S. Appl. No. 15/214,533.
Office action dated Sep. 22, 2017 in co-pending U.S. Appl. No. 15/214,533.
Notice of allowance dated Jan. 25, 2018 in co-pending U.S. Appl. No. 15/214,533.

(56) References Cited

OTHER PUBLICATIONS

Office action dated Sep. 6, 2018 in co-pending U.S. Appl. No. 15/691,895.
Office action dated Jul. 2, 2018 in co-pending U.S. Appl. No. 15/691,895.
Chinese communication, with English translation, dated Sep. 30, 2018 in co-pending Chinese patent application No. 201580059544.8.
Office action dated Dec. 11, 2018 in co-pending U.S. Appl. No. 15/691,895.

* cited by examiner

GASOLINE PARTICULATE REDUCTION USING OPTIMIZED PORT FUEL INJECTION PLUS DIRECT INJECTION

This application claims priority to U.S. Provisional Patent Application Ser. Nos. 62/399,755, filed Sep. 26, 2016; 62/432,140 filed Dec. 9, 2016; 62/477,587 filed Mar. 28, 2017; and 62/531,935, filed Jul. 13, 2017, the disclosures of which are incorporated in their entireties.

BACKGROUND

Spark ignition (SI) gasoline engines that use direct injection (DI), particularly those that are turbocharged, provide important efficiency increases over port fuel injection (PFI) engines and are rapidly increasing in use. The vaporization cooling from direct injection provides increased resistance to knock, thereby allowing operation at higher levels of turbocharging and/or compression ratio.

However, particulate emissions from DI gasoline engines are a health concern because they are small particles that can lodge in the lungs and are more than 10 times greater in mass per mile driven than emissions from PFI engines and are about 10-100 times greater in number per miles driven.

Gasoline particulate mass and number are presently regulated in Europe and more stringent regulations are expected. Regulations are expected in the US and California in the near future.

There is a need for a robust and low cost means to greatly reduce these particulate emissions with at least a near zero impact on vehicle fuel efficiency and preferably a zero or positive impact on vehicle fuel efficiency.

SUMMARY

Additional features of a PFI+DI system that is optimized for reducing DI-generated PM emissions using a particulate generation model are disclosed. These features include additional control techniques for timing of direct injection. Illustrative computational results for decreasing PM emissions from SI gasoline engines operated in various drive cycles are also presented. These calculations illustrate the very large potential reduction in direct injection generated particulates (e.g. 98%) that can be obtained.

The present invention also discusses how this optimized PFI+DI system could remove the need for using a gasoline particulate filter (GPF) by providing DI-generated particulate reduction, reliability, efficiency and cost advantages relative to use of GPF with a DI only engine. Alternatively, it could be used in combination with a GPF to ease GPF operation requirements and/or provide additional particulate reduction and robustness. Symbiotic uses of GPF technology in combination with optimized PFI+DI are described. In addition, the present invention also describes how approaches used for reducing emissions for optimized PFI+DI can be utilized in engines that are fueled with DI alone.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Basic Features

Figure 1:
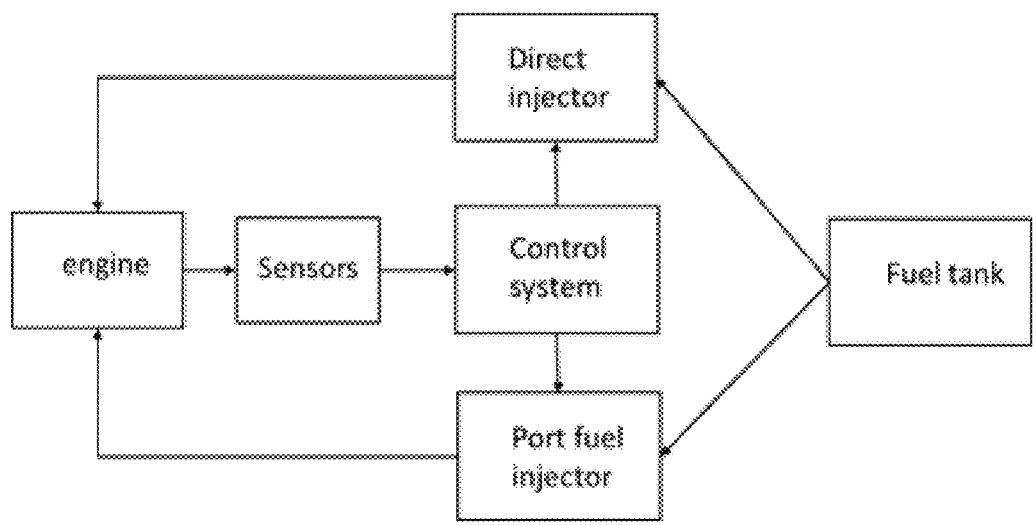
FIG. 1 is a block diagram of a Control System for a PFI+DI System according to one embodiment.

The basic control features of the optimized PFI+DI control system are shown in FIG. 1. Inputs to controlling the amounts of port and direct injected fuel include information for active control using a knock detector and, when needed, open loop control to determine the fraction of fuel that must be directly injected to prevent knock; and information about the total amount of fuel used at various values of torque and speed in the drive cycle.

Key parameters that are controlled can include spark retard and/or other knock suppression techniques; direct injection pulse timing relative to piston position in the intake and compression strokes; and direct injector pulse width. The control system can use closed and/or open loop control and employ look up tables. The direct injection timing can depend on parameters that include temperature, fuel injection pressure, engine torque and engine speed. The fuel in the fuel tank can be gasoline; a low alcohol concentration gasoline-alcohol mixture such as E10, or some other fuel.

The fuel management system uses a layered set of synergistic approaches:

(1) Minimizing the fraction of fuel that is directly injected while preventing knock;
(2) Reducing particulate emissions by reducing required knock resistance;
(3) Control of direct injection operation period and timing.

Each of these approaches is described in more detail below.
Minimizing the fraction of fuel that is directly injected while preventing knock The first approach robustly minimizes use of direct injection so that it is limited to the fraction of total fuel that is needed to prevent engine knock by vaporization cooling as the engine operating parameters, particularly torque, change over a drive cycle. Prevention of knock (unwanted self-ignition that can damage the engine) enables use of smaller engines to provide the same torque and power as larger engines and also operate at higher compression ratio, thereby improving efficiency.

Since direct injection is not needed for knock prevention at low torque, the engine can be fueled entirely by PFI in this regime. PFI provides homogeneous air/fuel mixtures. At a certain level of torque, some DI must be used to prevent knock and the fraction of fuel that is provided by DI increases as the knock suppression requirement increases with increasing load.

The control system matches the fraction of fuel provided by DI (including zero or 100% use of DI) to that needed to prevent knock as the torque and speed vary between zero and their highest values. Using this technique over the torque and speed range of a drive cycle minimizes the average fraction of fuel $f_1$ that is provided by direct injection over the drive cycle. Even if the matching only occurs over a large fraction of the torque range from zero to its highest value rather than 100% of the range (e.g. if occurs in at least 80% of the torque range), there will be a large reduction in the average fraction of fuel that is provided by direct injection.

In the absence of effects from other approaches which are mentioned below, the use of the first approach over a drive cycle reduces particulate emissions from direct injection to a parameter $f_1$ times the amount of particulate emissions that would occur if the engine were entirely fueled by direct injection. The amount of particulates generated by direct injection is proportional to the amount of direct injection that is employed at each value of torque and speed. When the effects of the other approaches into account, the fraction of particulates that are generated relative to an engine using direct injection alone will be less than $f_1$.

The amount of reduction of DI-generated particulates using the first approach alone can be calculated for various drive cycles. The fraction of fuel that is directly injected is determined by the requirement to prevent knock at various values of brake mean effective pressure (BMEP), which corresponds to torque per cylinder volume, and speed during the drive cycle.

To minimize use of direct injection, the fraction of fuel used at various points in the drive cycle is matched to that needed to prevent knock. It is substantially equal to the value needed to prevent knock. As torque is reduced from its highest value, the fraction of fuel provided by direct injection is continually decreased so as to be substantially equal to the fraction needed to prevent knock and reaches 0% at a certain value of torque.

The fraction of fuel that is provided by direct injection in engine operation at various operating points during a driving cycle is determined by a knock sensor and/or by a lookup table using a calculation for the required fraction of directly injected fuel for knock control at various values of torque, temperature and speed for a given engine.

Figure 2:
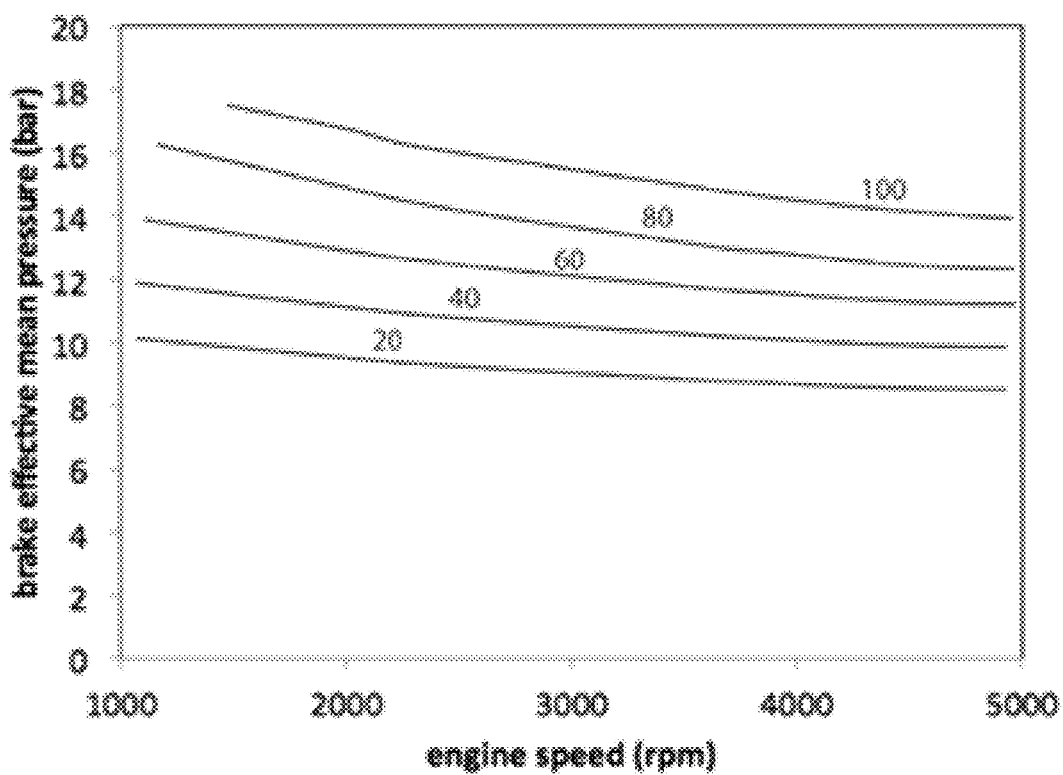
FIG. 2 shows illustrative contours of the percentage of fuel that is provided by direct injection at borderline knock in a gasoline engine fueled by PFI+DI as a function of brake mean effective pressure and engine speed for a turbocharged gasoline engine with a compression ratio of 12 and a downsizing of 30%.

The information about the fraction of fuel that is required to prevent knock is combined with information about the fraction of time the engine is operated at various values of torque and speed for a given drive cycle to determine the fraction of fuel, $f_1$ that is directly injected over a drive cycle. $f_1$ is higher for an aggressive drive cycle such as the US06 cycle where more time is spent at high BMEP where a higher fraction of directly injected fuel is needed FIG. 2 shows contours for the required DI gasoline fraction (in percentage) for knock avoidance for a turbocharged engine with an inlet manifold pressure of 1.5, operating at maximum brake torque (MBT) timing, with a compression ratio of 12. This combination of pressure and compression ratio has around the same direct injection knock suppression requirement as an engine with an inlet pressure of around 1.9 bar, a downsizing of around 45% and a compression ratio of 9.5. FIG. 2 thus represents an illustrative example of turbocharged direct injection gasoline engines.

This type of computationally generated information could be used in a lookup table for the control system. The look up table could use the combination of this computationally generated information and engine measurements. It could provide information of the fraction of fuel that must be directly injected to prevent knock throughout the engine torque-speed operation space.

For a typical turbocharged gasoline direct injection engine when at least 40% of the fuel is provided by direct injection at the maximum load, the fuel management system would allow knock free operation at about ⅔ of the maximum torque.

At the highest values of torque, the engine is required to operate mostly on DI gasoline. Although higher speed reduces the time for the autoignition that produces knock, the required DI is more or less constant with engine speed at a given load, as a result of the engine operating at higher power (and thus higher temperatures) at the higher speeds.

Table 1 shows the relative amounts of DI-generated particulates for the US06, urban UDDS and highway HWFET light duty drive cycles using this approach. The percent DI-generated PM reduction is also shown. For the US06 cycle and the representative engine parameters used in FIG. 1, $f_1$ and correspondingly the relative amount of DI-generated particulates) is less than 0.3. This fraction is reduced to less than around 0.2 when 100% reduction of cold start DI-generated particulate emissions is taken into account, as described later.

For typical urban cycles such as the UDDS cycle or less aggressive highway cycles such as the HWFET, an illustrative value of $f_1$ is less than about 0.05.

TABLE 1

Illustrative reduction in DI-generated particulates for various drive cycles by matching DI fraction of fuel to that needed to prevent knock and by achieving 100% reduction in direct-injection cold-start emissions by using 100% port fuel injection.

|  | f | % reduction of DI-generated particulates |
|---|---|---|
| US06 | <0.2 | >80% |
| UDDS | <0.05 | >95% |
| HWFET | <0.05 | >95% |

Reducing Particulate Emissions by reducing required knock resistance

A second approach is to further reduce $f_1$ by applying a means to reduce the knock resistance that must be provided by direct injection at given values of torque and speed throughout the engine operating range. Techniques for doing this include spark retard, upspeeding and variable valve timing. These techniques can significantly reduce $f_1$ but also reduce efficiency. They are applied selectively so as to maximize the amount of additional particulate reduction for a given amount of efficiency loss. Other techniques that could be applied are variable valve timing; internal exhaust gas recirculation (EGR); cooled EGR (especially at high loads); and the substitution for open-valve port fuel injection where direct injection would otherwise need to be used to prevent knock.

One control feature is to provide a set amount of spark retard in crank angle degrees for engine operation above torque (or torque and speed) values where direct injection would otherwise be required. The application of spark retard moves the contours of DI fuel percentage in FIG. 2 upward.

Illustrative results are shown in Table 2 for operation in the US06 driving cycle which, as previously mentioned, is a very aggressive drive cycle that requires much more time at high torque than other drive cycles. The amount of direct injection is minimized by maximum use of port fuel injection without the onset of knock.

TABLE 2

Illustrative effect of spark retard on DI-generated particulates in the US06 cycle. Spark retard is in crank angle (CA) degrees

| Spark retard | 0 | 5 | 10 |
|---|---|---|---|
| Efficiency, normalized | 1 | 0.98 | 0.89 |
| DI gasoline, normalized | 1 | 0.62 | 0.31 |
| Reduction in DI-generated particulates | >80% | >85% | >90% |

The results in Table 2 are for an engine with a compression ratio of 12 and downsizing of around 30%, and are normalized for the case of no spark retard. The amount of particulate generation from direct injection is reduced in proportion to the reduction in $f_1$ when only the first and second approaches are applied.

As shown in Table 2, increasing spark retard by 5 crank angle (CA) degrees reduces $f_1$ by nearly 40% along with a small 2% relative decrease in efficiency. For a 10 CA degree spark retard, there is a reduction of $f_1$ of about 70% along with a 10% decrease in efficiency. The fuel management system can be operated so as to insure that the spark retard that is used is no greater than 10 CA degrees and preferably no larger than 5 CA degrees.

Table 2 also shows percent reduction in DI-generated particulates relative to 100% DI injection using the information in Table 1. For the US06 drive cycle, the estimated percent reduction is greater than 85% for an efficiency decrease of 2%. For the UDDS and HWFET cycles, based on these calculations a reduction of greater than 95% may be achievable without the use of spark retard. For these cycles where there is very little need for DI for controlling knock, there is no need for spark retard for its minimization.

Another option for introducing spark retard is to only deploy it at the higher end of the range at which direct injection would otherwise be used.

An additional option for introducing spark retard is to increase it with increasing DI fuel fraction. No change in spark retard would be required when no direct injection is employed at low values of torque. The spark retard would be increased with increasing torque when direct injection is employed and could be adjusted so as to be equal to the amount needed to prevent knock. This approach could be employed to minimize the amount of efficiency loss from its use.

The spark retard that is employed can be limited so as not to generate temperatures that would damage a turbocharger. The need for fuel enrichment to limit temperature could thus be avoided. Fuel enrichment can result in increased hydrocarbon emissions.

In addition to reducing $f_1$, the use of spark retard can further reduce particulate emissions by decreasing the amount of fuel that is directly injected (in contrast to the fraction of fuel that is directly injected) and thus decreasing the duration of the direct injection. The decrease in the duration of direct injection enables an increase in the fraction of time that fuel is directly injected that avoids piston wetting. This impact of spark retard is described in the section on injection operation period and timing.

Selective use of upspeeding or variable valve timing to reduce particulate emission can also be employed in a way that is analogous to the use of spark retard. Upspeeding reduces the DI requirement faster than the increased speed reduces the window for injection without piston impingement, and thus results in decreased particulate emission during warmed engine operation as described below.

The calculations for DI minimization and for use of spark retard to enable a lower fraction of DI use are based on well established information about engine operation.

Control of Direct injection Operation Period and Timing

A third approach to decrease PM emissions, which uses a computational model for optimization, is to reduce the duration (length of time) of injection of directly injected fuel so that as much of it as possible it falls in a window between two crank angle limits where particulate production due to when piston wetting does not occur.

Figure 3A:
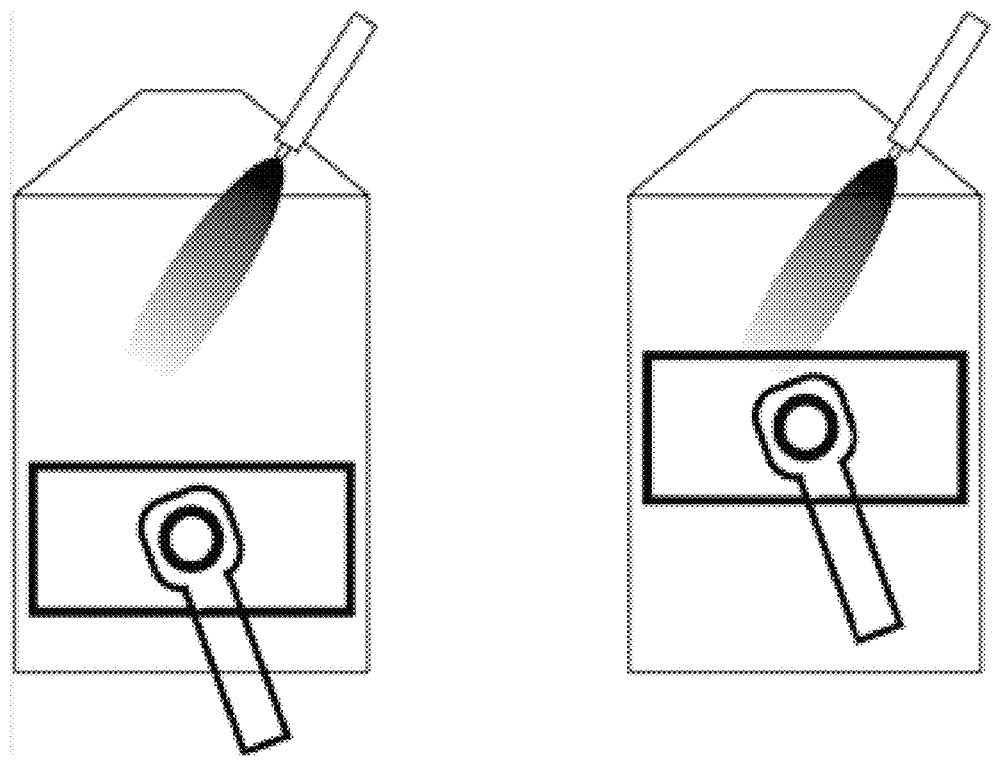
FIG. 3A is a schematic of conditions for no piston wetting (left) and piston wetting (right) by directly injected gasoline and FIG. 3B shows piston position and threshold crank angles where particulate generation occurs.
Figure 3B:
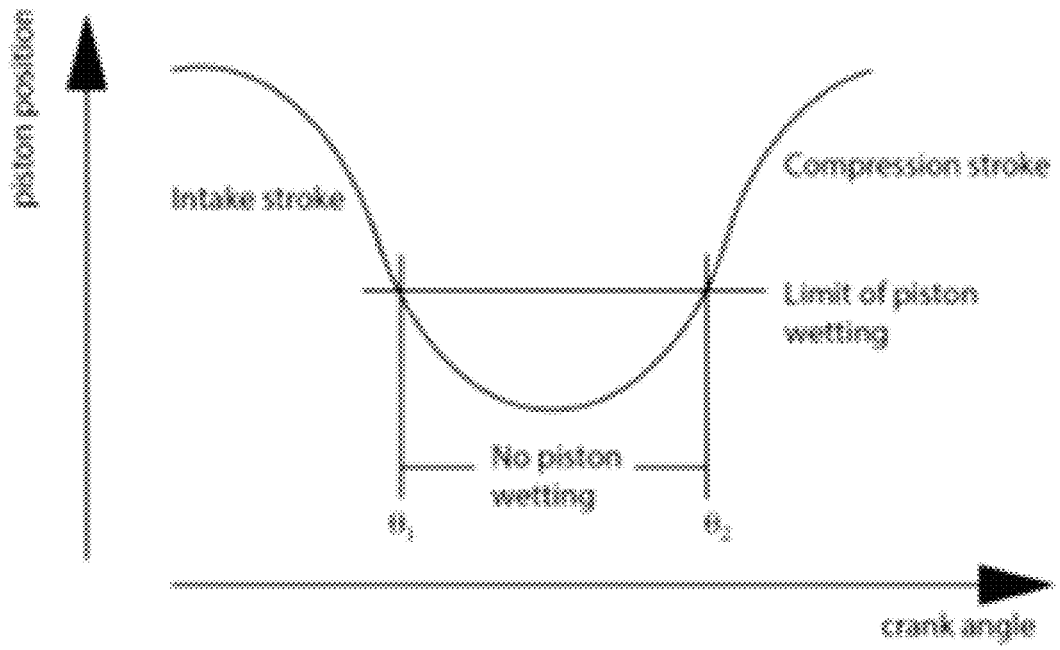

Particulate generation from direct injection is mostly due to piston wetting. In the computation model, which can be applicable to cold start operation as well as warmed up operation, it is assumed piston wetting occurs when the piston is high in the cylinder close to the fuel injector, and the direct fuel injector is open either earlier than a threshold crank angle $\theta_1$ during the intake stroke, or later than another crank angle $\theta_2$ during the compression stroke, as shown in FIGS. 3A-B.

When the crank angle is such that the piston is sufficiently low in the cylinder, liquid from the direct injection is not able to reach the piston wall and produce particulates. In the model, piston wetting does not occur for the time period during which direct injection occurs within the time period between $\theta_1$ and $\theta_2$, as shown in FIG. 3B. If the direct injection entirely occurs between the time elapsed between the two crank angles, according to the model there would be no particulate production.

Since the time period for direct injection fueling depends on the amount of directly injected fuel, prevention or reduction of piston wetting can be obtained by limiting this parameter and by starting injection when the first crank angle occurs. That is, according to the model there is a window in time, or in crank angle degrees, between $\theta_1$ and $\theta_2$ where there is no impingement on the piston.

To obtain the greatest particulate reduction benefit, the direct injection should be initiated at $\theta_1$ (first crank angle threshold) and, if not, preferably at a later time that is less than 25% of the time elapsed between crank angle limits and more preferably at a time that is less than 5% of the time between crank angle degrees.

This approach provides a means to substantially reduce particulate generation by controlling the amount of directly injected fuel to be less than a threshold level at which the fuel injection time period exceeds the time between the two crank angle limits. When the amount of directly injected fuel is below this level, particulate emissions from piston wetting by direct injection can be reduced to a near zero level even when there a significant fraction of fueling by direct injection in order to prevent knock. The fuel injection can be provided by single pulse or a series of shorter pulse during the fuel injection period.

Even when the fuel injection time period extends beyond the threshold length at which piston wetting occurs, there will still be a reduction in the amount of particulate production due to the amount of fuel that was introduced into the cylinder during the time that falls within the window for no piston wetting. For that part of the fuel injection period that extends beyond the time between the crank angle limits, the model indicates a linear rise in the amount of particulate generation with increasing pulse duration, corresponding to an increasing amount of fuel that is directly injected. Even if the fuel injection period is twice the window between the threshold crank angle degrees, according to the model, there would still be around a factor of two reduction in particulate emissions.

The computational model determines the relative amount of direct injection-generated particulates (either in mass or number density) by determining the percentage of directly injected fuel that falls outside of the two crank angle thresholds. The percentage of directly injected fuel that falls outside of the two threshold crank angles depends on the fuel injection rate (which in turn depends on the fuel injection pressure), the amount of directly injected fuel and the time at which the fuel is injected. The amount directly injected fuel depends on BMEP and speed.

The crank angle degree limits can be determined for various engines by measurements in the laboratory. This information can be used in a lookup table for controlling injection timing and related engine and fuel injector parameters. Modeling of piston wetting process can also be used to determine the crank angle thresholds used in the creation of the look up table.

The crank angle limits, and thus the onset of piston wetting, depend on the direct injection fuel penetration length through the air-fuel mixture in the cylinder. This penetration length will depend on viscosity of the gas in the cylinder, which in turn depends on temperature and to a lesser amount, composition. Decreased viscosity at low temperature at time of cold start increases the penetration of the fuel droplets, increasing the piston wetting. In addition, the lower temperatures at cold start also reduces the rate of evaporation of the droplet, also increasing the piston wetting (as compared to conditions of warmed up operation). Increased penetration length results in a larger value of $\theta_1$ and a smaller value of $\theta_2$.

Because of these dependences on temperature, varying the time of the start of direct injection as a function of air temperature, engine temperature and other factors that determine direct injection fuel penetration length, including injector pressure and manifold pressure, can be used to reduce the direct injection particulate emissions.

At cold temperatures, the start of injection should be at a later crank angle in order to achieve the substantial reduction in piston wetting when the piston position is such that the path length from the injector to the piston is greater than the penetration length. Because of increased penetration of the directly injected fuel, the start of direct injection, which can correspond to the first selected crank angle, should be delayed by at least 10 to 20 crank angle degrees to avoid piston wetting depending on the injection pressure, the temperature and the motion in the cylinder. Similarly, the end of direct injection, which can correspond to the second selected crank angle should be advanced by at least 10 to 20 crank angle degrees to avoid piston wetting. Thus, the extent of the window in which there is greatly reduced piston wetting can be reduced by 20 to 40 crank angle degrees.

A look up table can be used to control the start of injection in crank angle degrees as a function of temperature and other parameters. This approach could be used for engines that use only direct injection as well as for engines that use optimized PFI+DI.

At engine start-up, it is challenging to provide enough time for fuel evaporation, and thus when direct injection is used, as early start of injection as possible is desired, with the limitation of the piston wetting. The engine operation can start with port fuel injection can use as much port fuel injection as possible during the cold start period including operation entirely on port fuel injection. By the time that DI is needed for controlling knock, the fuel pressure in the high pressure DI should be built up.

Means of preheating the cylinder, such as air compression, could be used to reduce the increased direct injection particulate generation that occurs during cold start due to a longer fuel penetration path and lower fuel vaporization relative to warmed up operation. There are several ways of preheating the charge. One possibility is to advance the timing of the exhaust valve, and in particular, the exhaust valve closing. Thus, there is a relatively hot, relatively high pressure gas in the cylinder at the time that the inlet valve opens. The back flow into the inlet manifold can be used to produce droplets from the pools in the inlet valves, and the higher temperatures should help increase the rate of evaporation for the PFI fuel, decreasing hydrocarbon emissions.

Advancing the exhaust valve by at least 30 and preferably at least 40 crank angle degrees increases the temperature in the cylinder by at least 30 K and preferably by at least 50 K. The higher temperatures in the cylinder, during the next cycle can help minimize the production of DI particulates by increased evaporation rates of the DI spray and increased viscosity, which decreases the penetration length. Temperature increases of around 50 C can be achieved in this manner. Other means of preheating the air include air preheaters, including electrical preheaters.

To provide illustrative calculations, our computational model employs the experimental measurements by Keterer and Cheng (On the Nature of Particulate Emissions from DISI Engines at Fast Idle, SAE Int. J. Engines 7(2):986-994, 2014, di:10.4271/2014-01-1368) of direct injection-generated particulates as function of start of injection (SOI) as a basis for the selected threshold crank angles $\theta_1$ and $\theta_2$. These crank angles are consistent with rough calculations of the spray penetration assuming 10 MPa injection and conventional nozzles for the injector, at the conditions of a modern 2 liter engine with the stock fuel injector.

It is not expected that the penetration will vary much with either speed of the piston (although it affects the charge motion in the cylinder) or the cylinder pressure. Generally in warmed up operation, $\theta_1$ should roughly be between 120 and 140 degrees BBDC (Before Bottom Dead Center) and $\theta_2$ should be between 70 and 80 degrees ABDC (After Bottom Dead Center). The specifics depend on the injection pressure, the cylinder parameters, temperature and to lesser degree, the cylinder pressure, and cylinder charge motion.

Figure 4:
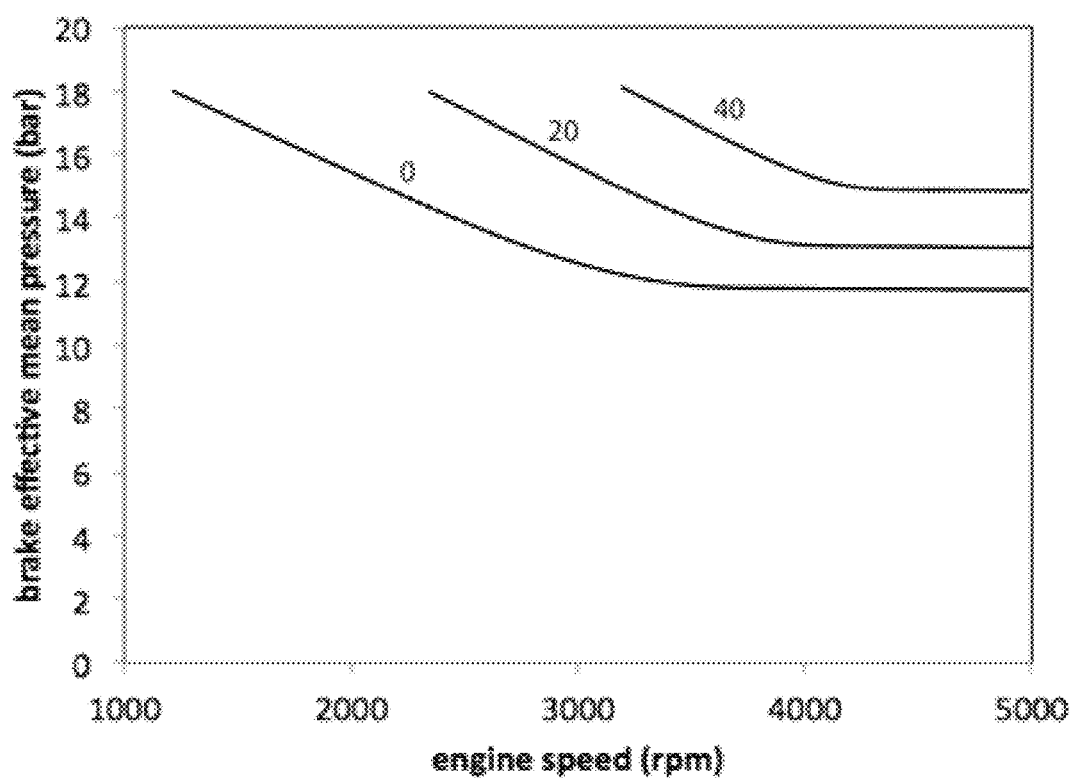
FIG. 4 is an illustrative calculation for the percentage of directly injected gasoline that produces particulates as a function of brake mean effective pressure (BMEP) and engine speed, using a fuel injector operated with a 10 MPa fuel pressure.

FIG. 4 shows an illustrative calculation for the percentage of directly injected fuel that produces particulates as a function of BMEP and engine speed. These parameters are related to the amount of directly injected fuel and thus the required injection time period for given fuel injection rate. The fuel injection rate is determined by fuel injection pressure. The injection time period decreases with in increasing fuel injector rate which increases with increasing fuel injection pressure. The fuel injection pressure for FIG. 4 is 10 MPa; direct fuel injectors operated at this pressure are in widespread use in gasoline engines.

As the engine speed increases, there is less time for injection, and thus the fraction of the DI fuel that falls on the piston increases at a given BMEP. It is assumed that the engine operates at MBT (maximum brake torque) timing.

Figure 5:
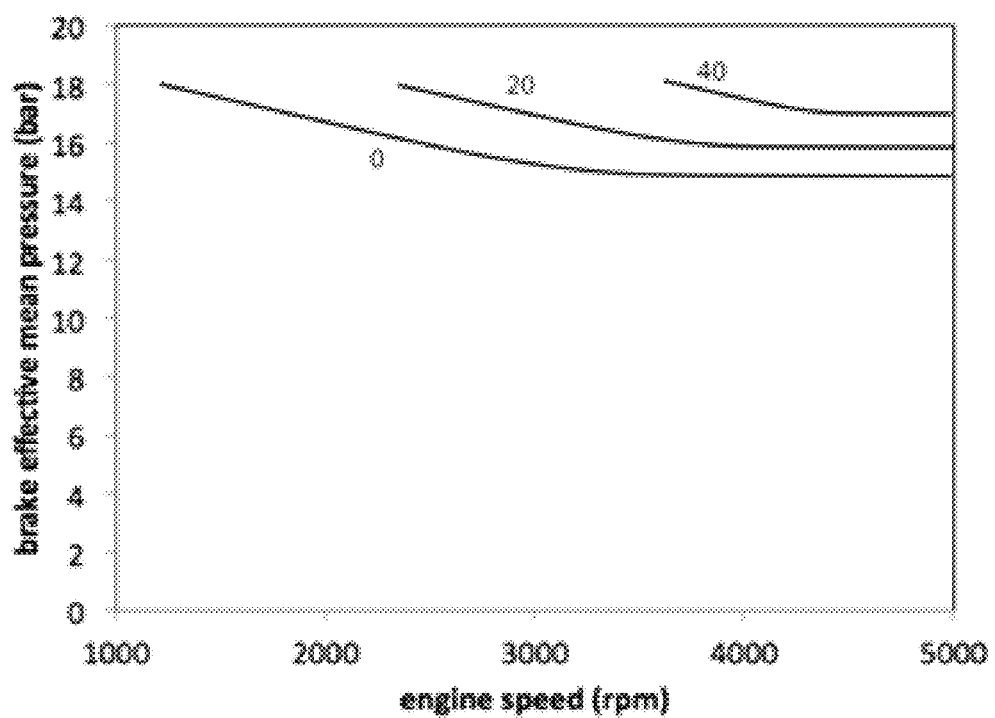
FIG. 5 is an illustrative calculation for the percentage of directly injected fuel that produces particulates as a function of BMEP and engine speed, using operated with a 15 MPa fuel pressure.

FIG. 5 shows the effect of a faster fueling rate using a higher fuel injection pressure of 15 MPa (50% more than FIG. 4). Higher pressure injection increases the amount of directly injection fuel and the BMEP that can be employed within the window without piston wetting, thereby decreasing the potential for piston impingement. When the injection period is shorter than the window for piston impingement, it is still desirable to inject early in the window, as this results in more homogeneous charge as well as lower peak temperatures. Comparing FIG. 4 and FIG. 5 shows that a 50% increase in the fuel injection pressure from 10 MPA to 15 MPA, can increase the BMEP at which the onset of particulate emissions occurs by at least 15%.

The combination of the first approach with the third approach can be used to reduce the amount of fuel that is directly injected and thus reduce the time period for direct injection. It can thereby be employed to substantially increase the fraction of directly injected fuel that occurs between the two crank angle limits. The amount of direct injection-generated particulates is minimized by matching the DI fuel fraction to substantially that needed to prevent knock. The matching would occur throughout the torque range or at least through a high fraction of the torque range.

The combination of these effects can result in a large decrease in the amount of warm-engine particulates with decreasing torque. This can cause a further substantial decrease in the fraction of particulates that are produced in a drive cycle relative to the amounts produced if all of the fuel were to be introduced by direct injection.

Relative to 100% direct injection, the direct injection-generated particulates are reduced first by substitution of port fuel injection for direct injection. This number is further reduced by reducing the fraction of direct fuel injection that produces particulates by increasing the fraction of direct injection that occurs between the two crank angle limits.

To determine the fraction of fuel that is directly injected and then impinges on the piston, the information in FIG. 2 is used to determine the amount of directly injected fuel required for knock suppression at various values of brake mean effective pressure. This information is then combined with information that relates the amount of directly injected fuel to the operation period of direct injection and the time between the crank angle limits.

Figure 6:
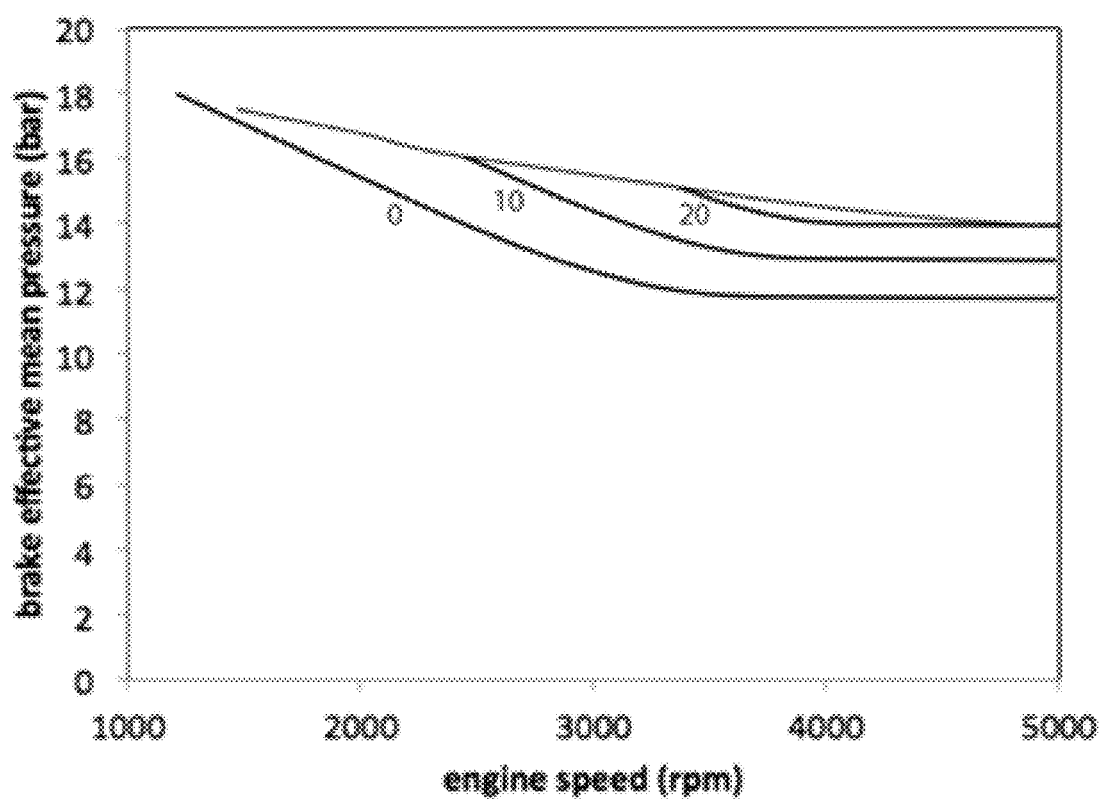
FIG. 6 is an illustrative calculation of the percent of total fuel that results in particulate production by direct injection, in which the top line shows where 100% of the fuel is directly injected and the fuel injector pressure is 10 MPa.

Using the combination of information from FIG. 2 and FIG. 4, FIG. 6 shows illustrative contours of the percentage of total fuel that is impinging on the piston (and thus, producing particulates) over the engine map for an engine with a compression ratio of 12 and which is downsized by 30%. The upper line in FIG. 6 indicates where 100% of the fuel is directly injected.

Comparing FIG. 6 with FIG. 2, it can be seen that at each value of torque and speed, the amount of direct injected generated particulates that are produced can be reduced by a substantial factor and in some cases, be eliminated all together by injection time duration and timing control.

When the fuel introduced by port injection is substituted for direct injection by an amount that is allowed by the requirement to suppress knock, there is a large reduction in the amount of directly injected fuel that is used and this causes an additional decrease in the amount of particulates that are generated at given values of BMEP and engine speed. In addition, an increase in the injector fuel pressure by a factor of two would cause a large shift of contours of constant particulate generation to values of higher BMEP.

The fraction of total fuel over a given drive cycle that impinges on the piston and produces particulates can be determined by combining information about the amount of operation at various points of torque and speed with the information in FIG. 6. Table 3 shows these results for a representative light duty truck with a turbocharged 3.5 liter engine for the UDDS, US06 and HWFET cycles. The fuel injector pressure is 10 MPa. The first row shows the fraction of directly injected fuel that is used over the drive cycle when DI is used and when PFI+DI is employed so that the fraction of fuel that is directly injected matches that needed to prevent knock. With no additional effects, this is equal to the fraction of fuel over a drive cycle that produces direct injection generated particulates, $f_1$.

The second row in Table 3 shows the fraction of total fuel that impinges on the piston taking the effect of injection timing and pulse length into account using the information in FIG. 6. This corresponds to the fraction of total fuel that results in direct injection generated particulates, $f_2$.

For the US06 cycle in Table 3, $f_1$ is around 9%. This number could be further reduced by use of spark retard or some other knock suppression technique.

The 9% production of direct injection generated particulates is for the warmed up part of the drive cycle. Assuming that one third of direct injection generated particulates are produced at cold start and that this number can be reduced to zero by 100% use of port fuel injection (as discussed below), the direct injection generated particulates could be reduced to around 6%.

Providing some margin, it would be reasonable to assume that direct injection generated particulates could be reduced by at least 90% over the US06 by matching the fraction of directly injected fuel to that needed to prevent knock (without use of spark retard or some other knock suppression mechanism). Even a greater margin for 90% reduction could be obtained by use of spark retard of some other knock suppression mechanism, The reduction in particulate generation would be much greater for the UDDS and HWFET drive cycles.

Taking the effect of injection timing and pulse length into account the direct-injection particulate generation for the US06 cycle in Table 3 could be reduced by about a factor of 100 by using PFI+DI instead of DI alone ("fraction wall wetting"=0.001 for PFI+DI vs. 0.096 for DI). Even if the level of direct-injection generated particulates using optimized PFI+DI is only a factor of 20 lower than that for use of DI alone in the same engine that provides the same efficiency and performance for the US06 drive cycle, this provides a large improvement over the 4 to 5 times reduction from a gasoline particulate filter. The reductions provided by optimized PFI+DI for less aggressive drive cycles are even greater.

Additional reduction of direct-injection generated particulate emissions could be obtained by temporarily operating at a higher fuel injector pressure (e.g. 15-20 MPa) or using spark retard in the warmed up part of the drive cycle.

TABLE 3

Illustrative relative direct injection-generated particulate generation for the UDDS, US06 and HWFET cycles for a turbocharged DI engine, the Ford 3.5 liter ecoboost engine. The fuel injector pressure is 10 MPa.

| | UDDS | | US06 | | HWFET | |
| --- | --- | --- | --- | --- | --- | --- |
| | DI | PFI + DI | DI | PFI + DI | DI | PFI + DI |
| Fraction of DI | 1 | 0.005 | 1 | 0.088 | 1 | <0.001 |
| Fraction wall wetting | <0.001 | 0 | 0.096 | 0.001 | 0 | 0 |

In Table 3, the row for "the fraction of DI" shows relative particulate generation for the case where particulate generation is reduced by matching the fraction of fuel that is directly injected to that needed to prevent knock. The row for "fraction wall wetting" shows the fraction of total fuel that produces piston wetting by impingement of directly injected fuel.

Additional reductions can be obtained by combining the knock reducing techniques of the second approach (e.g. spark retard) with both the first and third approaches. The application of these techniques can be highly leveraged due to the very steep decrease in DI particulate generation with decreasing torque. These techniques can be applied so as to minimize any efficiency decrease for a given amount of particulate reduction.

Control Techniques for Cold Start and Warmed Up Operation

During the cold start period, it could be advantageous for the control system to be operated so as to be different for the cold start versus the warmed up period of engine operation. The direct-injection generated particulate emissions are much greater during cold start than during the warmed up engine period. Roughly one third to one half of the particulate emissions occur during this period.

It can be especially important to minimize the use of direct injection during cold start by matching the fraction of fuel that is directly injected to that needed to prevent knock. Further reduction can be obtained by use of spark retard.

A rough estimate is for the increased particulate cold start period of 100 seconds. This cold start period is typically less than 10% of the time of a typical drive cycle. Hence, the use of spark retard can have a larger impact on direct-injection generated particulate reduction relative to any resulting efficiency loss averaged over a drive cycle.

Increased spark retard (e.g. in the. 5-10 CA degree range) could be used to reduce direct injection use over the increased particulate emissions cold start period down to a very low level (less than 5% and preferably less than 2% of the total fuel use) or to zero with zero or minimal impact (less than 1% and preferably less than 0.5%) impact on overall drive cycle efficiency. The spark retard could be varied with torque during cold start, and also in warmed up operation, so as to limit its use based on the amount needed to bring the DI fraction to zero or a desired very low level, when the required spark retard is less than a specified number (e.g. 10 CA degrees or less). If spark retard that is required is larger than the specified number, the spark retard is kept constant at the specified number.

Use of other means of reducing the need for direct injection to suppress knock, such as variable valve timing and upspeeding can also be employed.

Control of injection time period and timing could also be used to further insure that the amount of particulate generation from direct injection used is zero or at least at a very low level during the cold start period for increased particulate production. If direct injection is used, the start of direct injection can be determined and/or varied as a function of temperature information and other various inputs to the control system so as to avoid or reduce operation before the selected first crank angle and after the second threshold crank angle for particulate production from wall wetting.

In addition, if direct injection is used during cold start, temporary use of higher direct fuel injector pressure during part or all of the cold start period could be employed to reduce or eliminate direct injection-generated particulates.

The spark retard that is used in the increased particulate generation cold start period could be varied as a function of engine speed; torque; engine temperature; time after engine start; and fraction of fuel that would otherwise be needed to be directly injected to prevent knock. A look up table could be used to determine the amount of spark retard that would meet the objective: a combination of desired reduction in direct-injection generated particulates (in mass or particulate number) and a limit on the adverse effect on drive cycle efficiency. The look up table could take the effects of the above means of reducing direct injection generated particulates into account.

In both the cold start and the warmed up period of the drive cycle, the effects of selectively used spark retard on reducing the fraction of directly injected fuel and thus reducing the amount of particulate generation from direct injection can be determined for various control features. The control system can be operated so as to meet various goals (e.g. maximizing particulate reduction per amount of efficiency loss; and/or limiting efficiency loss to a given amount).

As is the case for the cold start period, an additional technique that can be used during warmed up period is to temporarily increase the injection pressure so as to increase the rate of fuel introduction. This reduces the required fuel injection duration and increases the amount of directly injected fuel that can be used before exceeding the threshold for particulate emission from piston wetting.

Increasing the fuel pressure also results in smaller, higher velocity aerosols. The smaller aerosols have increased viscous drag (per unit mass) than larger aerosols, and evaporate faster, in part compensating for the increase in penetration depth due to the higher speed. The increased penetration depth decreases slightly the window for injection without wall wetting, but this is a second order effect, the main being the reduction in the total injection duration.

This increase in the allowed amount of directly injected fuel before the threshold for particulate emission from piston wetting is reached increases the threshold brake mean effective pressure (BMEP) at which particulate generation occurs.

The optimum use of a temporary increase in fuel injector pressure could be determined from information about the percent of operation time at various positions in the engine map and the change in particulate generation at those positions when the fuel injection pressure is increased.

The amount of time that this technique could be used during a drive cycle would be limited so as to not cause injector overheating or to exceed some other injector or fuel pump operation limit.

The temporary increase in injector pressure could be used so as to have the greatest impact on particulate reduction. Because this technique would involve small amount of extra power use from the engine and would only be used during a small fraction of the drive cycle, it would have a negligible impact on engine efficiency. Determination of the greatest impact on particulate generation for a given time of temporary injection could be employed to determine how to best use a temporary increase in injector pressure.

In addition to a decreased direct injection duration, high pressure injection also decreases the fuel aerosol droplet size, increasing the evaporation rate. Increased evaporation rate decreases the temperature in cylinder, as evaporative cooling of the cylinder charge early in the compression stage is more effective in decreasing peak temperatures in the cylinder than late evaporative cooling. Higher pressure injection thus allows for decreased amount of directly injection fuel required for preventing knock, decreasing the potential for piston impingement.

As an example, the temporary increase in pressure could be obtained by operation of a 10 MPa-15 MPa pressure fuel injector for a limited time at 20 MPa or more. Today's high performance gasoline fuel injectors are operating around 20 MPa.

The increased pressure could be applied based upon the amount of direct injection fuel required and the amount of engine power required and could be limited so as to prevent any adverse effect on the injector system. The increased pumping power for the temporary increased injector pressure would be small compared to the pumping power used over a drive cycle.

Temporarily increased injector power could be especially useful during high power engine operation in warmed up operation as well as in cold start. During high power operation, a longer direct injector pulse length would be needed than at lower power and could thereby result in more direct injection being used outside of the crank angle degree limits. Use of higher pressure operation during this time could play an important role by reducing the direct injection pulse length.

The change in injector pressure could be either a set amount or a variable amount to provide the largest impact in reducing particulate emissions.

The point or points in the drive cycle where the temporary increase in fuel injector pressure would be used could be determined by the engine power at different points, the amount of time spent at these points for various drive cycles, and the impact of the increase in injector pressure (linear reduction in particulate emissions versus reducing the injector period to below the threshold level).

Some options for fuel injector design and operation at temporary operation at higher pressures are the use of an electric pump that is driven harder during times of increased pressure demand, or the use of pumps with a variable bypass for controlling the pressure in the system, the bypass being reduced or closed during the times of high pressure demand.

As fuel injector technology improves over time, the use of even higher pressure temporary injection (e.g. 20 MPa or higher) could provide a further decrease in the particulate generation described in conjunction with the approaches described above.

Another control option is to vary the start of direct injection as a function of the point in the engine torque-speed map at which the engine is operating. A look up table could be used for this control feature. The dependence of the start of injection could be based on the model described here or on laboratory measurements of particulate generation as a function of start of injection at various torque-speed points or a combination of both. The start of direct injection could also depend upon engine temperature. Information about engine temperature, including information from a temperature sensor could be employed.

This direct injection control feature could be especially important for high power operation where the direct injection pulse length could be sufficiently long that the some of the direct injection would occur outside of the two crank angle limits. The control system could vary the direct injection timing so as to reduce or eliminate the amount of direct injection that would otherwise occur outside the selected crank angle limits that are selected based on experimental data and/or modeling. In this way particulate emission from piston wetting by directly injected fuel could be minimized. Further reduction of particulate emissions at high power operation can be obtained by use of spark retard to reduce the amount of direct injection needed to prevent knock and substitute port fuel injection for direct injection.

Because of the effect of lower temperature operation in reducing the extent of the crank angle extent between the two crank angle limits at lower temperatures, especially during cold start (e.g. the first 100 seconds of engine operation), variation of the direct injection timing with temperature in addition to variation with other parameters such as torque and speed can also be especially important.

The techniques for reducing particulate generation from fuel that is directly injected when optimized PFI+DI is employed can also be used for engines that employ only DI. The control of direct injection timing as a function of torque and speed so as to reduce the amount of direct injection outside of the two crank angle limits as well as control based on engine temperature can be employed in engines that use direct injection alone as well as engines that use optimized PFI+DI. Use of higher pressure, both at a constant value and in temporary operation could also be utilized for the case of direct injection alone. Temporary use of higher pressure for DI only operation could be especially impactful during cold start or during periods of high power operation.

Summary of Computational Model Results

The model calculations indicate that matching the fraction of fuel that is provided by direct injection to that needed for knock suppression along with a 100% or a very high (greater than 95%) use of port fuel injection during cold start could reduce the amount of DI-generated gasoline particulates from a gasoline engine operated in the US06 cycle by at least 85% and preferably at least 90%. For the UDDS and HWFET drive cycles, the amount of DI-generated particulates could be reduced by more than 95%.

Use of timing of the direct injection to begin at the first crank angle degree limit and keeping the injection period sufficiently short would further insure a greater than 98% reduction in direct injection particulates for the UDDS and HWFET cycles. Our computational modeling indicates that it could provide a reduction of at least 95% for the US06 cycle for a fuel injector pressure of 10 MPa. Direct-injection generated particulates could be reduced by at least 95% for all US test drive cycles.

Temporary or continuous higher direct injector pressure (e.g. in the 15-25 MPa range) or use of increased spark retard could provide greater margin for achieving this level of direct injection generated particulate reduction or a larger reduction factor of direct-injection generated particulates (in mass and in number), such as a reduction of at least 98% in all US test drive cycles.

For engines that use port fuel injection in addition to direct injection for other purposes (e.g. for higher efficiency and/or higher performance, which also use a substantial amount of port fuel injection), the additional cost for operation so as to greatly reduce particulate emissions can be very low.

Optimized PFI+DI technology could provide greater reductions in DI-generated particulate emissions in gasoline engines than the 80-90% provided by gasoline particulate filter (GPF) technology along with the advantages of lower cost; a simpler, more reliable system; and no adverse effects of back pressure on efficiency. It could thus be used in a DI gasoline engine instead of a GPF.

Use of Optimized PFI+DI with a GPF

As an alternative to removing the use of a GPF, the optimized PFI+DI technology could be used along with a GPF for greater particulate reduction and/or reduction of GPF cost and detrimental impact on fuel efficiency.

For example, greater particulate reduction could be obtained by a lower cost GPF which could also reduce the already very low engine-out particulate emissions by a modest factor (for example, less than a factor of four). It could be possible to use a filter with thinner wall or decreased cell density in order to trade reduced back pressure (thereby improving fuel economy) but with decreased trapping efficiency of the particulate matter (addressed by reduced engine-out particle emissions). The back pressure efficiency loss might be reduced by at least a factor of 2 (e.g. from a 2% efficiency loss to less than a 1% efficiency loss). Use of this more modest GPF could also provide reductions in particulates generated from port fuel injection.

For the US 06 drive cycle, the combination of modest GPF with a particulate reduction factor of four and optimized PFI+DI could potentially reduce tail pipe direct-injection generated particulates by a factor of at least 50 relative to the DI injection alone. This reduction is much greater than the reduction factor of 5 to 10 using DI injection alone plus a state of the art GPF.

The combination of engine operation with optimized PFI+DI followed by exhaust treatment with a GPF can provide a greater reduction of both tailpipe particulate number and mass than the GPF alone. The reduction in mass is largely achieved through a greater reduction of ultra fine particulates (>25 nanometer). There is also at least 5 times greater reduction of nanoparticulates (<25 nanometers) than use of optimized PFI+DI alone.

In addition, the reduction of particulates by use of the optimized PFI+DI operation prior to treatment by the GPF can be important for avoiding GPF problems during prolonged driving conditions (for example, more than 10 minutes) where the GPF does not warm up sufficiently to burn the particulates. For example, under repeated operation with cold engine conditions, soot in the GPF can build up to an unsafe condition. When the engine warms up sufficiently to burn the soot after this prolonged period of soot accumulation, there is a possibility of a thermal runaway, depending on the oxygen concentration in the exhaust.

By use of optimized PFI+DI operation to greatly decrease the particulate production during light load operation, the potential for heavy particulate buildup in the GPF is greatly decreased. Using optimized PFI+DI to decrease the rate of generation of particulates by factors of 10 to 100, a given gasoline particulate trap could operate for a time 10 to 100 times longer for building up comparable soot in the trap. As a consequence of this increased time, the probability of obtaining the high temperature needed for soot oxidation is substantially increased, thereby avoiding most cases of soot buildup and a possible uncontrolled exothermal event that can damage the trap.

An additional benefit with very low soot formation, is that it is possible to have low temperature soot oxidation by $NO_2$ that is present in the exhaust flow. Engine exhaust when it has excess oxygen (for example, during an excursion to a rich condition during the dithering of the air fuel ratio commonly used to control stoichiometric operation in the engine) could convert a fraction of the NO generated into $NO_2$, which is a powerful oxidant. There could be engine operating conditions when the $NO_2$ present in the unit is sufficient to eliminate the soot in the GPF. This operation is enabled by the reduced generation of the soot by the PFI+DI approach to control particulates.

It may be possible to convert some of the NO into $NO_2$ in the upstream regions of a 4-way catalyst (a 3 way catalyst combined with a GPF) used to eliminate soot in the downstream region of the 4-way unit. $NO_2$ particulate elimination could be used either in engines that are dithering around stoichiometric conditions, or engines that use lean-rich cycles for NO control [See, for example, Parks, J., Storey, J., Prikhodko, V., Debusk, M. et al., "Filter-Based Control of Particulate Matter from a Lean Gasoline Direct Injection Engine," SAE Technical Paper 2016-01-0937, 2016, doi: 10.4271/2016-01-0937].

The GPF design can be optimized in a number of ways under conditions for the low soot operation enabled by engine operation with optimized PFI+DI. These include adjusting the size (diameter, length), the wall thickness, the cell density (numbers of cells in the honeycomb per unit cross sectional area of the GPF), the porosity, the pore size distribution, the catalyst loading or the material of the GPF.

If the engine particulate generation is decreased by a factor $\eta$, the wall area in the GPF can be decreased by $\eta$ for comparable soot loading and the volume can be decreased by $\eta^{1.5}$. The catalyst loading may be decreased by $\eta$, for comparable soot loadings in the case with and without PFI+DI particulate control. For example, for a comparable soot loading in the GPF, the catalyst loading could be reduced by a factor of more than 3 while still providing greater than three times lower tailpipe particulate mass emissions than in the case with use of the GPF alone. The amount of $NO_2$ generated by the engine and catalyst upstream of the GPF can also be decreased by the same factor of $\eta$.

Thus, the GPF design and operation can be optimized to increase durability (mostly due to ease of operation at low temperature), reduce cost (due to reduced size and decreased catalyst loading), and with GPF optimized for further reduction of particulate emissions, especially of nano particulates when used with an engine that is operated with optimized PFI+DI.

Thus when used in combination with a GPF, the PFI+DI approach for controlling particulates can both provide greater particulate reduction and enable improved GPF performance and lower exhaust treatment cost. In addition to the option of using a smaller GPF, optimized GPF construction or optimized use of a GPF combined with the PFI+DI, the optimized PFI+DI approach can be used with a 4-way system, where a 3-way catalyst is combined with a GPF. The decrease of the particulate generation by the use of PFI+DI prevents the need for substantial increase in the size of the 3-way catalyst when it is converted to a 4-way catalyst and thereby enables use of the 4-way catalyst without the additional cost that would otherwise occur. One can could be used instead of two cans.

A range of GPF design parameters are available from increasing the pore size of the GPF and thereby reducing back pressure from use of the GPF. The pressure drop from a GPF is dependent on the pore size, the frontal area of the GPF, the porosity of the GPF, the catalyst loading and the wall thickness/cell size. [See, for example, Ito, Y., Shimoda, T., Aoki, T., Yuuki, K. et al., "Next Generation of Ceramic Wall Flow Gasoline Particulate Filter with Integrated Three Way Catalyst," SAE Technical Paper 2015-01-1073, 2015, doi:10.4271/2015-01-1073]

Increasing the mean pore size decreases the pressure drop. For example, increasing the pore size from 12 to 16 microns decreases the pressure drop by over a factor of 2, while increasing the particulate number that escapes the GPF by a factor of 2. Since the PFI+DI approach decreases substantially the particulate number, a GPF with a larger pore size (and thus a smaller pressure drop) can be used in combination with a PFI+DI particulate control approach. A reduction in back pressure by at least 30% and preferably at least 50% can be achieved relative to what would be the case by using the combination of the optimized PFI+DI approach with the a GPF with a larger pore size. It should be noted that the particulate trapping efficiency in the GPF is not a strong function of the wall thickness or the cell density.

Similarly, the pressure drop across a 4-way catalyst is dependent on the catalyst loading (usually containing a precious metal). The catalyst is deposited in the pores of the GPF, resulting in increased pressure drop in the GPF. By using PFI+DI as a first approach to controlling particulate mass or number, the GPF with larger pores can be used with the same catalyst loading. The GPF with larger pores with the same catalyst loading may be insufficient to satisfy the regulatory requirements, but when combined with PFI+DI the particulate emissions can be below the regulatory requirement. The combination of the optimized PFI+DI approach with a changed GPF can thus enable use of a GPF in a 4-way catalyst with lower back pressure.

The pressure drop is also a strong function of the pore volume per unit volume (the ratio between the pore volume to the total volume of the GPF). Increased pore volume per unit volume decreases substantially the pressure drop, but may result in structural challenges. The impact of the catalyst loading on the pressure drop is substantial and is especially relevant for a 4-way unit. In this case, the use of PFI+DI allows the use of increased pore volume per unit volume, with larger porosities, controlling the particulate emissions by a combination of PFI+DI and GPF and operating with lower back pressure and also lower tailpipe emissions that with use of a GPF alone.

The buildup of soot on the GPF also results in a substantial increase in pressure drop. In addition, the resulting pressure drop associated with increased soot loading is much larger when the pore volume per unit volume decreases. The soot implants itself within the pores, decreasing the flow area and increasing the pressure drop. By decreasing the rate of generation of the particulates with PFI+DI, it is possible to avoid large buildup of soot in the GPF.

It is possible to use the engine management system described in this invention with a sensor in the GPF. By sensing the amount of soot in the GPF, it is possible to control the use of spark retard or heavy EGR under conditions when the GPF is relatively clean, with little soot buildup; the engine management can be set up not to minimize the particulate production, but rather to increase the efficiency and to possibly decrease other regulated emissions. As the soot builds up in the GPF, with an associated increase in pressure drop or danger of GPF plug-up, spark retard or heavy EGR can be used to decrease the generation of particulates, allowing for the soot already in the GPF to eventually combust.

Monitoring of the soot content in the GPF it is possible to adjust the rate of generation of particulates in the engine, while controlling the particulate loading of the GPF. It is important to be able to sense light soot loadings in the GPR, and thus, alternatives to pressure sensors may be required, such as microwave sensing of the GPF, or other techniques. In addition, as it is possible to also monitor the amount of soot and/or ash in the 4-way unit, it is possible to control engine operation for improved performance of the 4-way unit. For example, when there is increased ash (as for example, as the unit ages) in the GPF, filtration efficiency for control of particulates improves. Thus, the fuel management system can adjust the PFI+DI control (including injection timing, PFI/DI split, EGR, spark retard, valve timing) in order to improve efficiency/and or other emissions, while still meeting the particulate emission requirement (through the increased trapping efficiency of the ash-loaded GPF).

In the case of the use of the catalyst for converting some of the NO to $NO_2$ for control of the CO, hydrocarbon and/or particulate emission, the monitor can control the state of the 3-way catalyst (controlling, for example, the engine stoichiometry or additional injection of air), in order to provide improved conversion of the regulated emissions (CO, HC, NOx and particulates). The engine operation can be such that the air/fuel ratio dithers (that is, brief excursions from stoichiometry), or through lean/rich periods of engine operation (i.e., longer periods of excursion).

Similarly, by having sensors in the 3-way catalyst or the 4-way catalyst that can sense the loading of the 3-way catalyst (for NO control), it is possible to adjust the oxygen excursion in the engine to increase the availability of free oxygen for assisting the burning of the soot in the GPF or in the 4-way unit. The minimum temperature for regeneration of the particulate filter is a strong function of the excess oxygen, and having controlled oxygen excursions enables regeneration of the particulate filter under driving conditions where the temperature of the exhaust is limited.

Increased Efficiency

The fuel management system for optimized PFI+DI system for direct-injection generated particulate reduction can be optimized for also meeting the goals of increasing efficiency relative to the use of DI injection alone. The PFI+DI combination over a drive cycle can be varied to accomplish an optimum combination of various objectives. For example, the control system can be designed so as to operate with port fuel injection alone or with a very small amount of direct injection over the cold start period for particulate emissions (e.g. less than 5% of total fuel) to maximize particulate reductions; and to maximize efficiency over the warmed up period of the drive cycle.

An attractive mode of operation during the warmed up part of the drive cycle could be to optimize the PFI/total fuel ratio for the highest efficiency while preventing knock and using this optimization in combination with optimal direct injection timing and pulse length.

The PFI+DI combinations for maximizing efficiency during the warmed up period of the drive cycle are likely to involve minimization of direct injection which is generally aligned with particulate reduction. Minimization of direct injection increases better mixing combustion stability and can allow use of increased EGR (internal or external).

These factors could increase drive cycle efficiency by at least 2% relative to using direct injection alone. Removing the need for a state of the art GPF that provides at least an 80% reduction in particulates and thus eliminating the resulting back pressure could provide another 1 to 2% efficiency gain relative to using a GPF. The combination of these effects could provide an efficiency gain of at least 3% and preferably at least 4% relative to a vehicle that used direct injection alone plus a GPF.

Another option is to use a GPF with reduced particulate reduction and lower back pressure than present GPFs (e.g. a factor of 4 or less reduction in direct injection generated particulates) which have lower cost and less back pressure. The combination of such a GPF with use of optimized PFI+DI could potentially provide more than a 98% reduction in direct-injection generated particulates, a factor of 4 reduction in port fuel-injection generated particulates and an overall efficiency gain of at least 2% and preferably at least 3% relative to use of direct injection alone and a GPF which provides a particulate reduction of 80 to 90%.

Use with EGR

In still another application, the use of the control system for PFI+DI can be combined with EGR (engine gas recirculation) to provide reduced particulates. The use of increased EGR can be employed to reduce the piston wetting by changing the viscosity of the gas, either through changes of composition or temperature. Changes in EGR can be used to adjust the critical crank angles. Internal EGR would increase the temperature of the charge, affecting the penetration of the fuel spray, as described above. External EGR would mostly affect the composition of the charge, as well as the temperature during the compression stroke (because of the impact on the ratio of specific heats, gamma). The addition of EGR could also modify the charge motion. Combustion stability could improve by providing some additional fuel in the region near the spark.

Appropriate injection timing of the fuel, such that piston wetting is avoided, would also improve the combustion stability, thereby enabling increased EGR. Increased EGR at light load could increase the efficiency of the engine, mostly due to decreased throttling and decreased heat transfer to the walls due to the dilution, while at heavy load, increased EGR could decrease the need for directly injected fuel.

Use in Dual Fuel Engines

A further application is for the particulate reduction approaches described here for the case of port injection of and direct injection of the same fuel to be also employed in an optimal manner for the dual fuel case where the direct injection uses a high ethanol concentration fuel.

Uses of Computational Model for Better Fueling System Design and Control

The computational model described here can be employed for fuel management system design and for control of the fuel management system using lookup table information provided by the computational model. The model determines the effects of BMEP, engine speed, direct injector pressure, drive cycle and other parameters on direct-injection generated particulate levels. It includes both a model for autoignition generation of knock and a model for the impacts of direct injection pulse length and timing. Effects of spark retard and other knock suppression techniques can also be included. The computation model could be used for optimizing operation of DI fueling alone as well as for the use of PFI+DI.

Different control techniques for cold start operation can additionally be incorporated as more information becomes available. In addition, the use of PFI+DI to increase efficiency can be included. The impacts of combinations of PFI+DI and gasoline particulate filters can also be incorporated in the model. The model can be used to determine direct-injection generated particulate levels over a wide range of operating conditions (including use of direct injection alone over the entire drive cycle).

Computational tools, such as CFD, can be used to determine the characteristics of the piston and injector that result in non-wetting of the piston. Models of the injectors, including spray pattern, droplet size and droplet velocity can be used to investigate the droplet cloud, droplet evaporation and impact of the injector on fluid motion in the cylinder. These CFD calculations for spray penetration can be used to determine more accurate values of $\theta_1$ and $\theta_2$ as a function of engine conditions, such as cylinder pressure, engine speed and engine temperature. The timing of direct injection, particularly the start of direct injection, could then be changed as a function of the parameters that change the values of $\theta_1$ and $\theta_2$. This adjustment of timing can be used to reduce the amount of direct injection that occurs before $\theta_1$ and after $\theta_2$ and to thus reduce the particulate generation from piston wetting that would otherwise occur.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A fuel management system for a spark ignition engine that is fueled with gasoline and uses port fuel injection and direct injection;
   wherein the use of port fuel injection is such as to reduce the n direct injection generated particulates by reducing the fraction of fuel in the engine that is directly injected while also preventing knock;
   and wherein during at least part of a drive cycle the fraction of fuel that is provided by direct injection is increased as torque is increased and wherein it is matched to that needed for preventing knock as engine torque and engine speed change;
   and wherein the substitution of port fuel injection for direct injection is also employed so as to reduce the percentage of directly injected fuel that produces particulates;
   and wherein reduction of the percentage of directly injected fuel that produces particulates is obtained by use of port fuel injection to increase the fraction of directly injected fuel that occurs between a selected first crank angle degree on the intake stroke and a selected second crank angle degree on the compression stroke;
   and wherein particulate emissions from direct injection decreases when the directly injected fuel is introduced after the first crank angle and before the second crank angle;
   and wherein the start of direct injection is adjusted so as to begin after the selected first crank angle and before the selected second crank angle;
   and wherein at least one of the selected first and second crank angles are determined by various inputs to the control system.

2. The fuel management system of claim 1 wherein the selected first crank angle is determined by various inputs to the control system.

3. The fuel management system of claim 1 wherein the selected second crank angle is determined by various inputs to the control system.

4. The fuel management system of claim 1 wherein the selected first crank angle is varied based on engine temperature.

5. The fuel management system of claim 1 wherein the selected second crank angle is varied based on engine temperature.

6. The fuel management system of claim 1 wherein the direct injection is initiated within the crank angle range between the first and second crank angle; and
   wherein the initiation is within the first 25% of time that the piston is between the first and second crank angle degrees.

7. The fuel management system of claim 1 wherein the selected first and second crank angles are based on a look up table that is uses experimental data about particulate emissions.

8. The fuel management system of claim 1 that uses information from a model for piston wetting.

9. The fuel management system of claim 1 wherein the overall efficiency is at least 3% higher than would be the case if direct injection alone were used along with a gasoline particulate filter that reduces particulate emissions by at least 80%.

10. The fuel management system of claim 1 wherein at at least some time in the first 100 seconds of engine operation, spark retard is used to enable operation with port fuel injection alone and wherein spark retard is less than 10 crank angles.

11. The fuel management system of claim 1 wherein the combination of matching of the fraction of fuel that is directly injected to that needed to prevent knock and the use of spark retard is employed to enable operation with port fuel injection alone during at least some time in the first 100 seconds of engine operation.

12. The fuel management system of claim 1 wherein the combination of matching of the fraction of fuel that is directly injected to that needed to prevent knock and the use of spark retard is employed to enable operation with port fuel injection alone throughout the first 100 seconds of engine operation and wherein spark retard is less than 10 crank angle degrees.

13. A fuel management system for a spark ignition gasoline engine which uses port fuel injection and direct injection;
and wherein the fraction of fuel that is provided by port fuel injection is such as to reduce the direct-injection generated particulates by reducing the fraction of fuel that is directly injected while preventing knock;
and wherein the substitution of port fuel injection for direct injection is also employed so as to reduce the percentage of directly injected fuel that produces particulates;
and wherein reduction of the percentage of directly injected fuel that produces particulates is achieved by use of port fuel injection to increase the fraction of directly injected fuel that occurs between a selected first crank angle degree on the intake stroke and a selected second crank angle degree on the combustion stroke;
and wherein a gasoline particulate filter is used to reduce particulate emissions in addition to the reduction provided by the use of the fuel management system.

14. The fuel management system of claim 13 wherein the use of the gasoline particulate filter reduces direct injection generated particulate tailpipe emissions by a factor of 4 or less.

15. The fuel management system of claim 13 wherein the time interval before soot regeneration is increased by at least a factor of 10 relative to what it would be if the engine were operated with direct injection alone and had a gasoline particulate filter that is either a separate unit or is combined into a four way catalyst.

16. The fuel management system of claim 13 wherein the gasoline particulate filter is designed with a higher porosity than would be the case if the engine were operated with direct injection alone and had a gasoline particulate filter that is either a separate unit or combined into a four way catalyst.

17. The fuel management system of claim 13 wherein the gasoline particulate filter is designed with a catalyst loading that is decreased by at least a factor of 5 compared to that which would be the case if the engine were operated with direct injection alone.

18. The fuel management system of claim 13 wherein the size of the gasoline particulate filter is decreased compared to that which would be the case if the engine were operated with direct injection alone.

19. The fuel management system of claim 13 wherein the tail pipe direct-injection generated particulates are reduced by more than 95% for the US 06 drive cycle.

20. The fuel management system of claim 13 wherein the tail pipe direct-injection generated particulates are reduced by more than 95% for the US O6 drive cycles and where the overall fuel efficiency is at least 3% greater than would be the case if the engine operated with direct injection alone and a gasoline particulate filter which reduced direct injection generated particulates by more than a factor of five was employed.

21. A fuel management system for a spark ignition engine that is fueled with gasoline and uses direct injection;
and wherein reduction of particulates generated from direct injection is obtained by increasing fraction of directly injected fuel that is introduced between a selected first crank angle degree that occurs on the intake stroke and a selected second crank angle degree that occurs on the compression stroke;
and wherein the start of direct injection is adjusted so as to begin after the selected first crank angle and before the selected second crank angle;
and wherein the selected first and/or second crank angles are determined by various inputs to the control system.

22. The fuel management system of claim 21 wherein the selected first crank angle is determined by various inputs to the control system.

23. The fuel management system of claim 21 wherein the selected second crank angle is determined by various inputs to the control system.

24. The fuel management system of claim 21 wherein the selected first crank angle is varied with engine temperature.

25. The fuel management system of claim 21 wherein the selected second crank angle is varied with engine temperature.

26. The fuel management system of claim 21 wherein the selected first and/or second crank angles are determined by inputs from a look up table that uses information from experimental determinations of particulate emissions as a function of crank angle.

27. The fuel management system of claim 21 wherein the selected first and/or second crank angles are determined by inputs from a look up table that uses information from model determinations of particulate emissions as a function of crank angle.

28. The fuel management system of claim 21 wherein increased fuel injection pressure is employed so as to increase the fraction of fuel that is directly injected between the selected first and second crank angles.

29. The fuel management system of claim 21 wherein increased fuel injection pressure is employed so as to increase the fraction of fuel that is directly injected between the selected first and second crank angles and wherein an increase in fuel injection pressure of 50% can increase the onset BMEP for particulate emissions by at least 15% relative to the onset BMEP for particulate emissions if increased fuel injection pressure is not employed.

30. The fuel management system of claim 21 wherein the fuel injection pressure increase is temporary.

31. The fuel management system of claim 21 wherein the fuel injection pressure increase is temporary and is employed during the first 100 seconds of engine operation.

32. The fuel management system of claim 21 wherein the fuel injection pressure increase is temporary and is employed during high power engine operation.

33. The fuel management system of claim 21 wherein an electric fuel pump is employed to temporarily increase fuel injector pressure.

34. The fuel management system of claim 21 wherein the first and second selected crank angles are varied based upon use of EGR.

* * * * *